United States Patent
Behrens (10) Patent No.: US 10,094,072 B2
(45) Date of Patent: Oct. 9, 2018

(54) METHOD AND APPARATUS FOR MILLING OF RAILROAD TRACK

(71) Applicant: Loram Maintenance of Way, Inc., Hamel, MN (US)

(72) Inventor: Jon Thomas Behrens, St. Michael, MN (US)

(73) Assignee: Loram Maintenance of Way, Inc., Hamel, MN (US)

( * ) Notice: Subject to any disclaimer, the term of this patent is extended or adjusted under 35 U.S.C. 154(b) by 0 days.

(21) Appl. No.: 15/659,159

(22) Filed: Jul. 25, 2017

(65) Prior Publication Data

US 2017/0321383 A1    Nov. 9, 2017

Related U.S. Application Data

(60) Continuation of application No. 15/218,591, filed on Jul. 25, 2016, which is a division of application No. 13/745,430, filed on Jan. 18, 2013.
(Continued)

(51) Int. Cl.
  B23C 3/00 (2006.01)
  E01B 31/13 (2006.01)
  (Continued)

(52) U.S. Cl.
  CPC ............. *E01B 31/13* (2013.01); *B23C 3/005* (2013.01); *B23C 5/20* (2013.01); *B23C 5/2269* (2013.01);
  (Continued)

(58) Field of Classification Search
  CPC ................. E01B 31/13; B23C 3/005; Y10T 409/306384; Y10T 407/1922
  See application file for complete search history.

(56) References Cited

U.S. PATENT DOCUMENTS 1,887,424 A    11/1932 Perazzoli
2,690,610 A    10/1954 Begle
(Continued)

FOREIGN PATENT DOCUMENTS

DE    19617276 A1    11/1997
EP    0668398 A1    8/1995
(Continued)

OTHER PUBLICATIONS

Machine Translation of Wo 95/20071, pp. 1-9, Jan. 31, 2018.*
(Continued)

*Primary Examiner* — Sunil K Singh
*Assistant Examiner* — Nicole N Ramos
(74) *Attorney, Agent, or Firm* — Patterson Thuente Pedersen, P.A.

(57) ABSTRACT

A milling system for milling a track surface with at least one rotatable milling plate. A modular blade system for each milling plate allows individual blades to be removed and replaced when an individual blade becomes dull or broken. The blade system also allows the milling plates to be oriented in both Type 2 and Type 3 configurations depending upon track surroundings and the presence of encumbrance. The milling plates can be mounted to a positioning assembly for adjusting the relative distance between the milling plate and the track surface as well as the angle at which the milling plate engages the track surface. The milling system can include a depth guide so as to physically prevent the milling plate from cutting too deeply into the track surface.

13 Claims, 10 Drawing Sheets

Related U.S. Application Data (60) Provisional application No. 61/588,472, filed on Jan. 19, 2012.

(51) Int. Cl.
    *B23C 5/20* (2006.01)
    *B23C 5/22* (2006.01)

(52) U.S. Cl.
    CPC ... *B23C 2200/0455* (2013.01); *Y10T 407/192* (2015.01); *Y10T 407/1908* (2015.01); *Y10T 409/303808* (2015.01); *Y10T 409/306384* (2015.01)

(56) References Cited

U.S. PATENT DOCUMENTS

| | | | |
|---|---|---|---|
| 3,116,538 A | 1/1964 | Severson | |
| 4,295,764 A | 10/1981 | Theurer et al. | |
| 4,372,714 A | 2/1983 | Theurer | |
| 4,490,947 A | 1/1985 | Theurer | |
| 4,534,689 A | 8/1985 | Theurer | |
| 4,583,893 A | 4/1986 | Liné | |
| 4,615,150 A | 10/1986 | Panetti | |
| 4,732,515 A | 3/1988 | Pomikacsek | |
| 4,843,765 A * | 7/1989 | Panetti | E01B 31/17 451/347 |
| 4,993,193 A | 2/1991 | Panetti | |
| 5,134,808 A | 8/1992 | Panetti | |
| 5,265,379 A | 11/1993 | Panetti | |
| 5,716,167 A * | 2/1998 | Siddle | B23C 5/241 407/36 |
| 6,033,166 A | 3/2000 | Hampel | |
| 6,033,291 A | 3/2000 | Mathison et al. | |
| 6,139,410 A * | 10/2000 | Okumura | E01B 31/17 451/347 |
| 6,638,138 B1 | 10/2003 | Luddeneit | |
| 6,719,616 B2 | 4/2004 | Mathison et al. | |
| 6,746,307 B2 | 6/2004 | Knoll et al. | |
| 6,789,983 B2 | 9/2004 | Mizutani | |
| 6,921,319 B2 | 7/2005 | Knoll et al. | |
| 6,981,907 B1 | 1/2006 | Korinek et al. | |
| 7,156,723 B2 * | 1/2007 | Natarajan | E01B 31/17 451/347 |
| 8,262,323 B2 | 9/2012 | Satran | |
| 2003/0083001 A1 * | 5/2003 | Natarajan | E01B 31/17 451/65 |
| 2003/0143928 A1 | 7/2003 | Knoll | |
| 2007/0256287 A1 * | 11/2007 | Kocherovsky | B23C 5/207 29/428 |
| 2009/0175693 A1 | 7/2009 | Jansson | |
| 2010/0135735 A1 | 6/2010 | Satran | |
| 2010/0215445 A1 | 8/2010 | Chen et al. | |
| 2012/0288342 A1 * | 11/2012 | Rungger | B23C 3/005 409/231 |
| 2013/0189045 A1 * | 7/2013 | Behrens | E01B 31/13 409/132 |
| 2014/0271012 A1 * | 9/2014 | Hughes | E01B 31/13 409/132 |
| 2016/0333531 A1 | 11/2016 | Behrens | |

FOREIGN PATENT DOCUMENTS

| | | | |
|---|---|---|---|
| EP | 0952255 A1 | 10/1999 | |
| WO | WO 9520071 A1 * | 7/1995 | B23C 3/005 |

OTHER PUBLICATIONS

MFL Sawing and Milling Technology download; downloaded Mar. 19, 2013; 19 pages.

Linsinger; Rail milling train SF02T-FS; printed Mar. 19, 2013; http://www.linsinger.com/en/products/rail-technology/rail-milling-train/2-19-22.htm; 1 page.

Linsinger; Rail milling train SF03-FFS; printed Mar. 19, 2013; http://www.linsinger.com/en/products/rail-technology/rail-milling-train/2-20-22.htm; 2 pages.

Linsinger; Rail Technology—Rail milling train SF06-FFS Plus; printed Mar. 19, 2013; http://www.linsinger.com/en/products/rail-technology/rail-milling-train/2-21-22.htm; 1 page.

Linsinger; Rail milling train MG31; printed Mar. 19, 2013; http://www.linsinger.com/en/products/rail-technology/rail-milling-train-mg31/schienenfraeszug_mg31/2-31-37.htm; 1 page.

PCT Search Report and Written Opinion dated May 13, 2013 for PCT Application No. PCT/US2013/022229 filed Jan. 18, 2013, 12 pages.

International Preliminary Report on Patentability dated Jul. 22, 2014 for PCT Application No. PCT/US2013/022229 filed Jan. 18, 2013, 9 pages.

Office Action dated Jul. 23, 2015 for Australian Patent Application No. 2013209555, 3 pages.

Office Action dated Feb. 2, 2016 for Canadian Application No. 2,861,338, 4 pages.

Search Report dated May 6, 2015 for EP Application No. 13738644.7 filed Jan. 18, 2013, 8 pages.

Office Action dated Nov. 24, 2016 for Canadian Application No. 2,861,338, 3 pages.

Application and File history for U.S. Appl. No. 13/745,430, filed Jan. 18, 2013. Inventors: Behrens.

Application and File history for U.S. Appl. No. 15/218,591, filed Jul. 25, 2016. Inventors: Behrens.

* cited by examiner

METHOD AND APPARATUS FOR MILLING OF RAILROAD TRACK

RELATED APPLICATIONS

This application is a continuation of application Ser. No. 15/218,591 filed Jul. 25, 2016, which in turn a division of application Ser. No. 13/745,430 filed Jan. 18, 2013, which claims the benefit of U.S. Provisional Application No. 61/588,472 filed Jan. 19, 2012, each of which is hereby fully incorporated herein by reference.

FIELD OF THE DISCLOSURE

The present invention relates generally to railway maintenance. More specifically, the present invention is directed to an apparatus and related methods for milling a track surface to remove irregularities in the track surface.

BACKGROUND OF THE DISCLOSURE

Railroad tracks generally comprise a pair of metal rails arranged in a parallel configuration so as to guide and support metal wheels of train cars. Use of these tracks to support heavy loads travelling at high speeds results in the formation of irregularities such as pits, burrs, cracks and deformations along the track surface. These irregularities can create excessive noise and vibrations as the wheels of the train car contact the irregularities. Similarly, the irregularities can also increase the fatigue on the rails and the train cars themselves creating substantial safety and maintenance problems. Although the irregularities can often be easily smoothed out of the track by grinding or milling the surface of each track section in a machine shop, removing each section for regular maintenance is impractical and expensive.

A common method of removing irregularities from the track in situ comprises pulling at least one rotating grinding stone that includes an abrasive surface along the track to grind the track surface so as to smooth out any irregularities without having to remove the section. One of the primary concerns with grinding out the irregularities without removing the track section is ensuring that the entire track surface is contacted by the abrasive surface so as to avoid missing any irregularities. Because of factors including different load weights and configurations of the trains traveling over the rails or even installation factors such as, for example, differing soil conditions beneath the rails, the track surface can wear unevenly along the railway. This makes it even more important that that the entire rail profile be contacted by an abrasive surface during the grinding operation. In response to this requirement, a variety of different grinding configurations have been developed are currently available to grind the entire rail profile.

In a Type 1 grinding configuration, a rotating grinding element rotates in a vertical plane above the rail. The abrasive surface is positioned on a perimeter edge of the rotating element and is beveled or shaped to match the rail profile such that it contacts the entire face of the rail surface as the rotating element is directed along the rail. The drawback of the Type 1 configuration is that the large surface area of the abrasive surface for each rotating element creates a substantial amount of friction requiring a relatively powerful motor to rotate the rotating element. Furthermore, the rotating element is typically rotated such that the abrasive surface travels past the track surface in the direction opposite the direction the rotating element is being pulled down the track to maximize the friction generated by the abrasive pad so as to efficiently grind the track surface. While maximizing the effectiveness of the abrasive pad, the friction created by the grinding acts as a brake slowing the grinding process, which can lead to increased amounts of downtime for the rail line being grinded.

In a Type 2 grinding configuration, the amount of power required to rotate the rotating element and the braking effect of the abrasive surface are both reduced by positioning the abrasive surface on the plane of the rotating element instead of the edge. The rotating element is positioned against the track surface such that the rail approximately bisects the center of the rotating element. By positioning the rotating element such that the rail is located proximate the center of the rotating element, the abrasive surface creates a desirable grinding pattern in which the abrasive surface is drawn across the rail surface perpendicular to the rail rather than parallel to the rail. In this grinding configuration, the abrasive surface of an individual rotating element only contacts a single facet of the rail profile, which significantly reduces the amount of power required to rotate the rotating element. However, in order to grind the entire track surface, a plurality of rotating elements operating in a variety of planes must be used to each contact different facets of the track surface so as to cooperatively grind the entire track surface. The drawback of the Type 2 configuration is that the position of the rotating elements prevents the Type 2 configuration from being successfully used on rail sections having encumbrances such as, for example, an inset in a road or a platform where an upper rail surface is even with a surrounding surface such as a road or platform.

A Type 3 grinding configuration somewhat resembles the appearance of a Type 2 grinding configuration in that it also utilizes a plurality of rotating elements with each rotating element rotating in a different plane so as to engage an individual facet of the rail profile rather the entire track surface. However, the rotating elements of the Type 3 configuration are beveled proximate to the edge of the rotating elements such that the rotating elements can rotate in planes that do not prevent the rotating element from being used in track sections having encumbrances such a roads or platforms. As shown in U.S. Pat. No. 7,156,723 to Nataraj an et al., which is herein incorporated by reference in its entirety, the Type 3 configuration is currently used with grinding processes where the abrasive surface can be easily beveled or shaped to properly contact the track surface. The inherent tradeoff between the Type 2 and Type 3 configuration is that because the abrasive surface of the Type 3 configuration is at the edge of the rotating element, the abrasive surface is drawn across the track surface parallel to the track rather than the more desirable perpendicular grinding pattern found with the Type 2 configuration.

Regardless of the configuration type, the contact between the abrasive grinding pad used in all grinding processes and the metal track surface creates a substantial amount of heat and sparking. As a result, most grinding systems for rail lines are required to include fire suppression systems for combating any fires resulting from sparking along the track. The potential fire risk posed by grinding processes has led to a recent trend in track maintenance to use a milling process to maintain the track instead of a grinding process.

Unlike a grinding process, a milling process uses rotating blades and/or bits to mill down the track surface to remove irregularities rather than using friction generated by an abrasive pad. Milling processes generate less heat and sparking than grinding processes, thereby minimizing the risk of fire. A drawback of milling processes is that the rotating blade or bit assembly must be carefully monitored as the blade or bit can easily cut too deeply into the track surface reducing the operating life of the track or creating an irregularity rather than removing the irregularities. Similarly, the milling blade or bit can become broken or dulled from repeated use. Replacing a broken blade or bit can cause significant delays if the blade or bit breaks in a remote location and a new blade assembly must transported to the work site.

Although significant development has been made in the area of removing irregularities from a track surface, it would be advantageous to further improve upon these current processes.

SUMMARY OF THE DISCLOSURE

The present invention is directed to a railway milling system that can be pulled along sections of track and comprises a plurality of milling plates, each plate including a plurality of milling blades for engaging the track surface so as to remove irregularities from the track surface. The plurality of milling blades are generally arranged along the periphery of the milling plate. The milling blades can be oriented above a length of rail such that the milling blades contact and mill the rail in a perpendicular orientation to the rail along sections of track that lack encumbrances. Alternatively, the milling blades can be angled and oriented such that milling blades contact and mill the rail in a parallel orientation to the rail along sections of track that include encumbrances such as, for example, roads or platforms. Each milling plate can comprise a modular blade assembly including a plurality of individual locking slots, each locking slot corresponding with a single milling blade. The locking slots allow individual milling blades to be easily removed and replaced if a blade becomes dull or broken. The modular blade assembly reduces down time required for the replacement of broken blades and increases the useful life of the milling plate as the individual milling blades can be replaced instead of the entire milling plate.

A rail milling system, according to an embodiment of the present invention, can comprise at least one milling module having a plurality of milling plates with each milling plate including a motor for rotating the milling plate. Each plate comprises a plurality of individual milling blades and a plurality of locking slots positioned along the periphery of the milling plate, each locking slot being adapted to releasably receive one of the milling blades. Each locking slot can further comprise an adjustable vice for individually gripping the corresponding milling blade. The milling module can comprise a positioning assembly for each milling plate such that the milling position and angle of milling plate can be controlled and adjusted. The positioning assembly can position each milling plate above a length of rail so as to contact and mill the rail in a perpendicular orientation for lengths of track that are free of encumbrances. Alternatively, the positioning assembly can angle each milling plate above the length of rail so as to contact and mill that rail in a parallel orientation for lengths of track that include encumbrances.

In operation, each of a plurality of milling plates is positioned at a unique angle such that each milling plate mills a unique facet of a rail profile. In combination, the plurality of milling plates cooperatively mill the entire rail profile as a milling module traverses a length of rail. Depending upon track location and surroundings, the milling plates can be positioned such that an edge portion of each milling plate engages the rail to provide a parallel milling pattern such as when encumbrances are present or alternatively, the milling plates can be positioned over the rail such that the rail bisects or nearly bisects the center of the rotating milling plate to provide a perpendicular milling pattern.

According to an embodiment of the present invention, a rail milling system can further comprise at least one depth guide adapted to contact a rail surface as a milling module is being pulled down the rail surface. The depth guide can operably attached to each of the milling modules so as to prevent individual milling blades of the milling module from cutting too deeply into the track surface. The depth guide is positionable to control a maximum milling depth of the milling module thereby controlling the extent to which the milling blades cut into or mill the track surface.

In another aspect, a method for milling a track surface according to the present invention can comprise providing a rotatable milling plate having a plurality of locking slots each adapted to receive a milling blade. The method can further comprise attaching a milling blade into each of the locking slots and positioning the milling blade to present a milling surface that is angled relative to a plane of the milling plate. The method can also comprise positioning the milling plate such that the plurality of milling blades engage a track surface, either in a parallel or perpendicular orientation to the track surface, dependent upon track surroundings such as, for example, the presence of encumbrances. Finally, the method can further comprise rotating the milling plate to cut or mill the track surface and remove irregularities from the track surface.

The above summary of the various representative embodiments of the invention are not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be more completely understood in consideration of the following detailed description of various embodiments of the invention in combination with the accompanying drawings in which:

FIG. 6b is a top, hidden view of the milling plate of FIG. 6a.

FIG. 7b is a partially hidden top view of the two milling plates of FIG. 7a.

FIG. 11 is a perspective, front view of the milling system of FIG. 8. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 1:
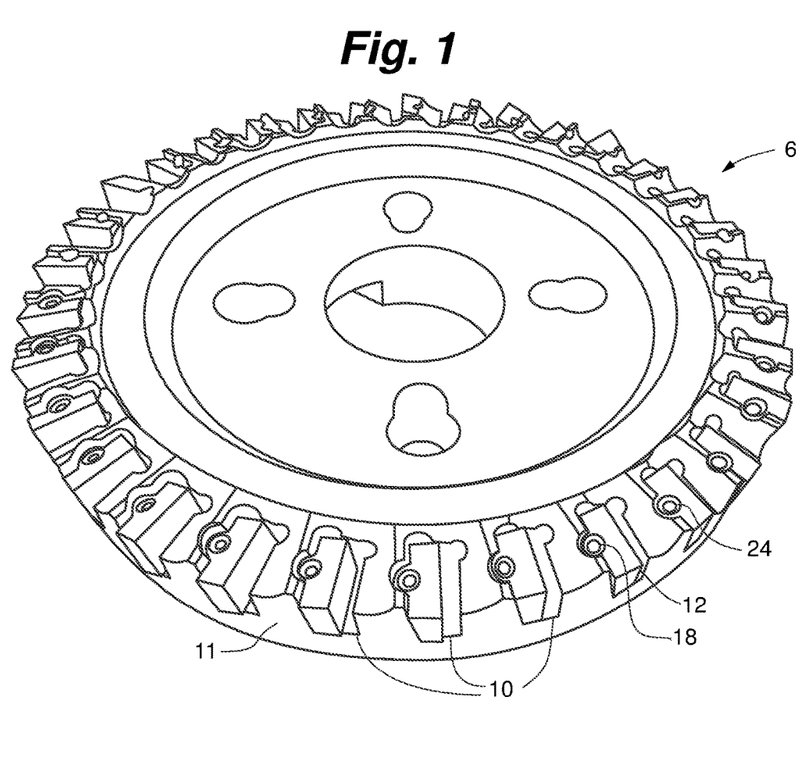
FIG. 1 is a perspective, bottom view of a milling plate according to an embodiment of the present invention.
Figure 2:
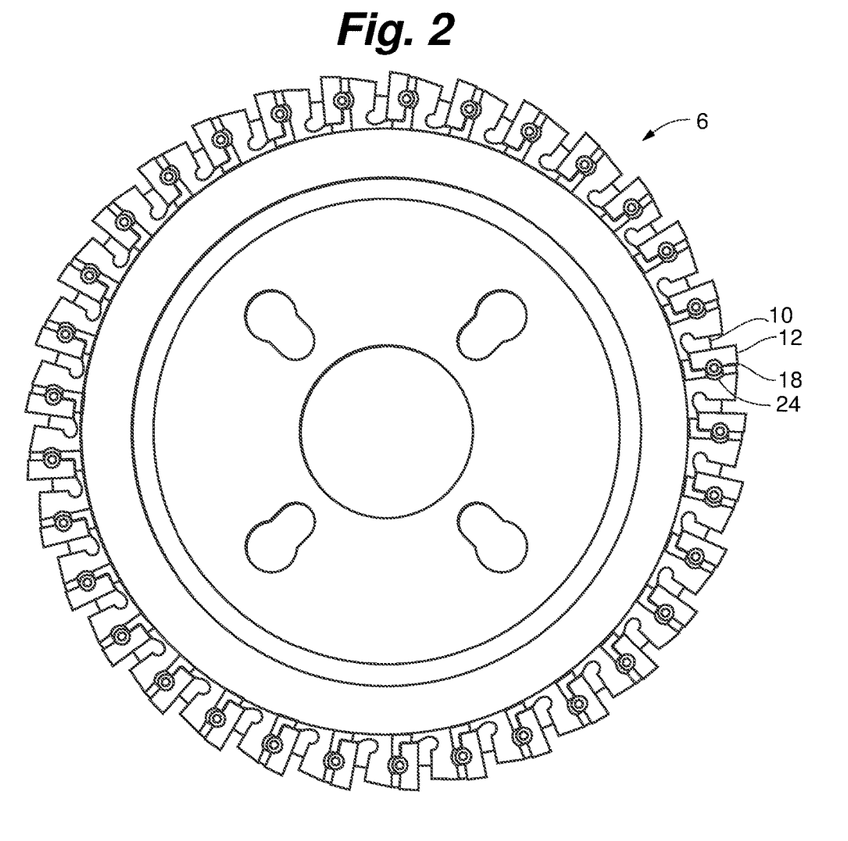
FIG. 2 is a bottom view of the milling plate of FIG. 1.
Figure 3:
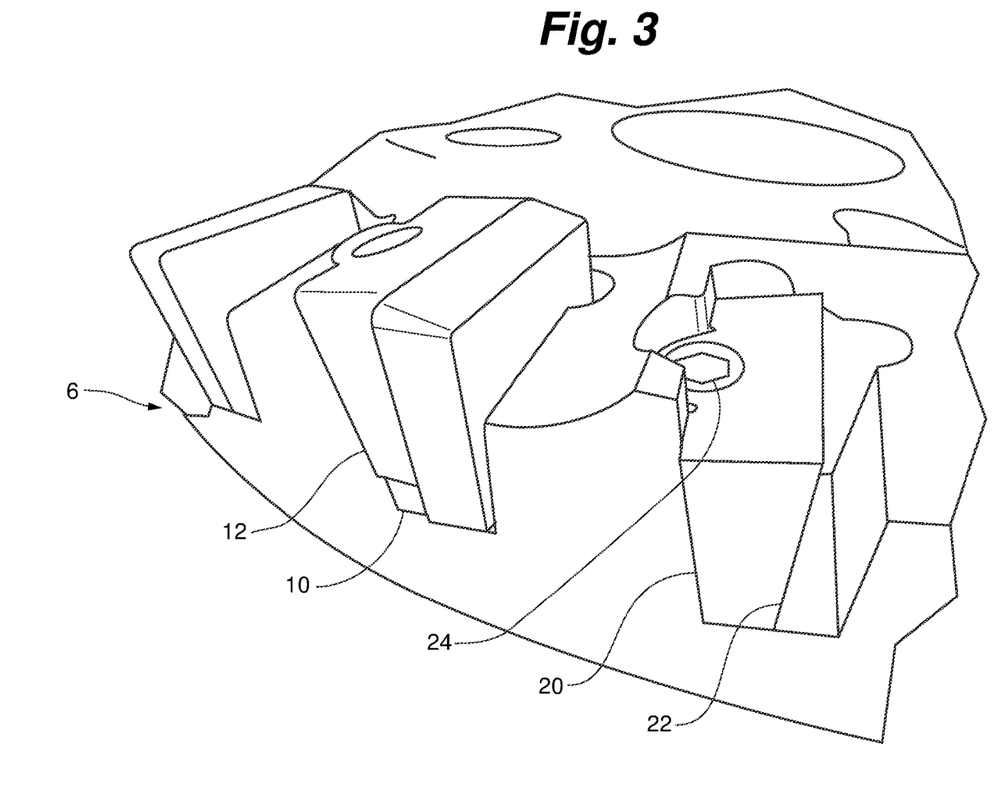
FIG. 3 is an enlarged, bottom perspective view of the milling plate of FIG. 1.
Figure 4:
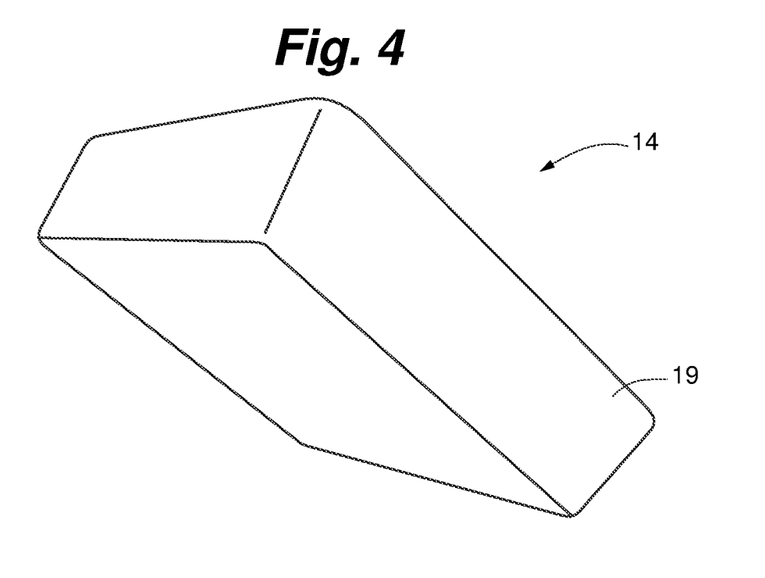
FIG. 4 is a bottom, perspective view of a milling blade according to an embodiment of the present invention.
Figure 5:
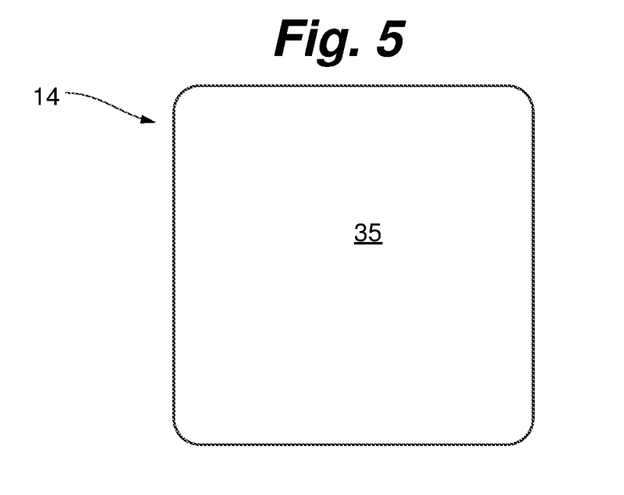
FIG. 5 is a top view of the milling blade of FIG. 4.

As illustrated in FIGS. 1 and 2, a representative embodiment of a milling plate 6 according to the present invention generally comprises a plurality of blade slots 10 each having a corresponding adjustable vice grip 12 and milling blade 14. The plurality of blade slots 10 are generally positioned proximate to a perimeter edge 11 of the plate 6 and each blade slot 10 further comprises a threaded slot bore (not shown) along one side of the slot 10. Each adjustable vice grip 12 further comprises a threaded vice bore 18 corresponding to the threaded slot bore of one of the plurality of slots 10. As shown in FIGS. 4 and 5, an embodiment of the milling blade 14 can comprise a generally rectangular shape having an angled milling surface 19 for milling the track surface As shown in FIGS. 1-2, each milling blade 14 is insertable into a corresponding slot 10 and retained by the adjustable vice grip 12. The adjustable vice grip 12 further comprises a flat side 20 for aligning the vice grip 12 with the side of the slot 10 and an angled side 22 for engaging the milling blade 14. A threaded set screw 24 is insertable through the threaded bore 18 of the vice grip 12 and into the threaded bore 16 of the corresponding slot 10. As the set screw 24 is tightened, the angled side 22 of the vice grip 14 will tighten against the milling blade 14 to lock the milling blade 14 within the slot 10.

Figure 6A:
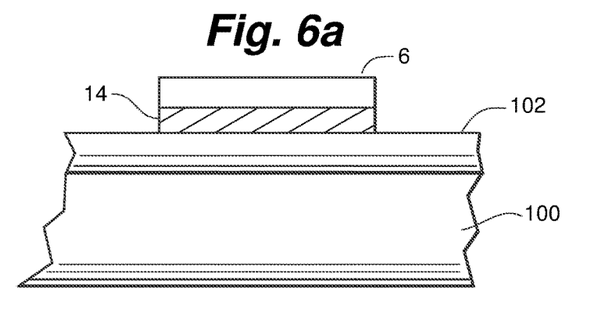
FIG. 6a is a side view of a milling plate engaging a track surface in a Type 2 configuration according to an embodiment of the present invention.
Figure 6B:
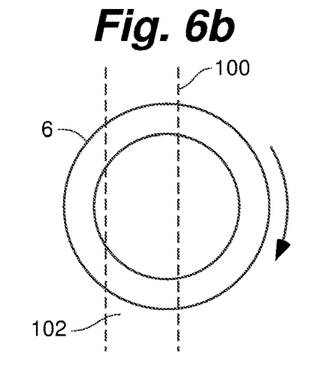
Figure 6C:
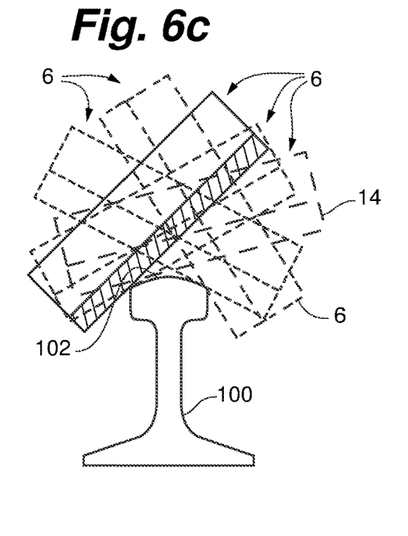
FIG. 6c is a front view of the milling plate of FIG. 6a illustrating milling an entire profile of a track surface according to an embodiment of the present invention.
Figure 7A:
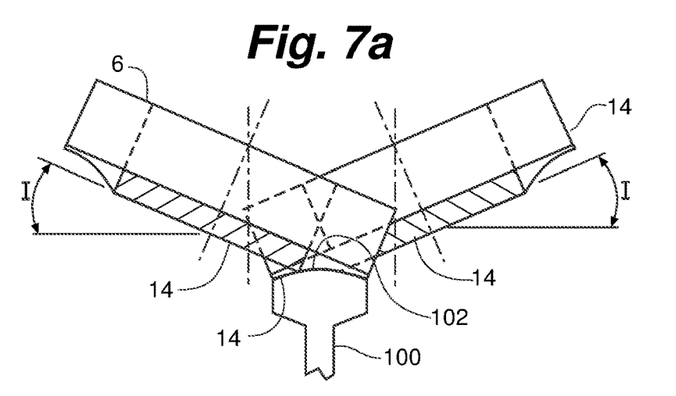
FIG. 7a is a front, partially hidden view of a pair of milling plates engaging a track surface in a Type 3 configuration according to an embodiment of the present invention.
Figure 7B:
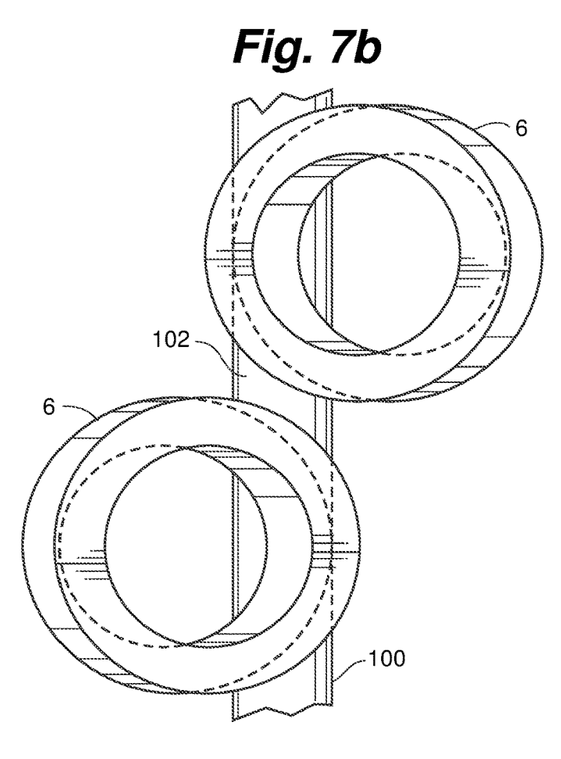
Figure 8:
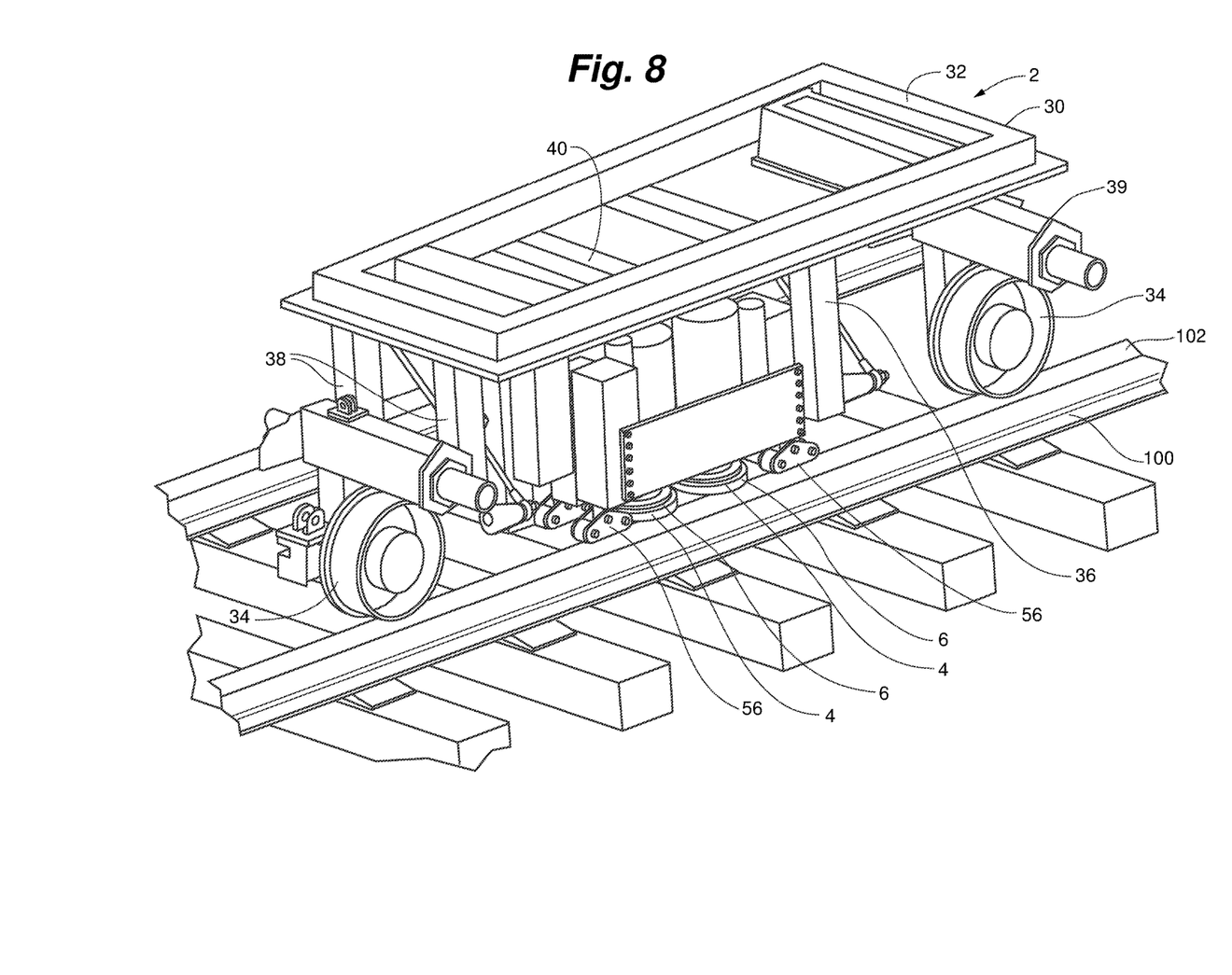
FIG. 8 is a detailed perspective top view of a portion of a milling system according to an embodiment of the present invention.
Figure 9:
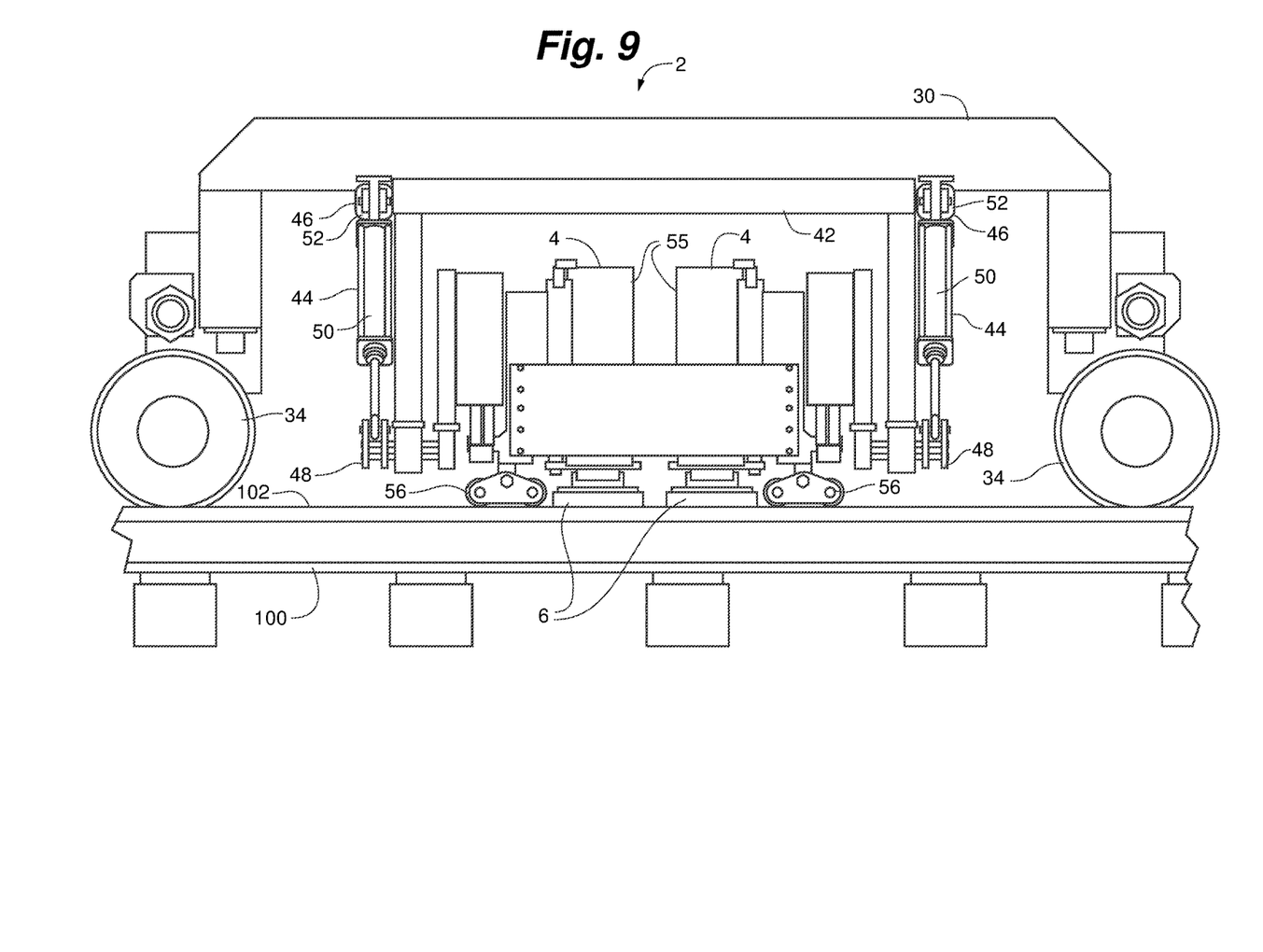
FIG. 9 is a side view of the milling system of FIG. 8.
Figure 10:
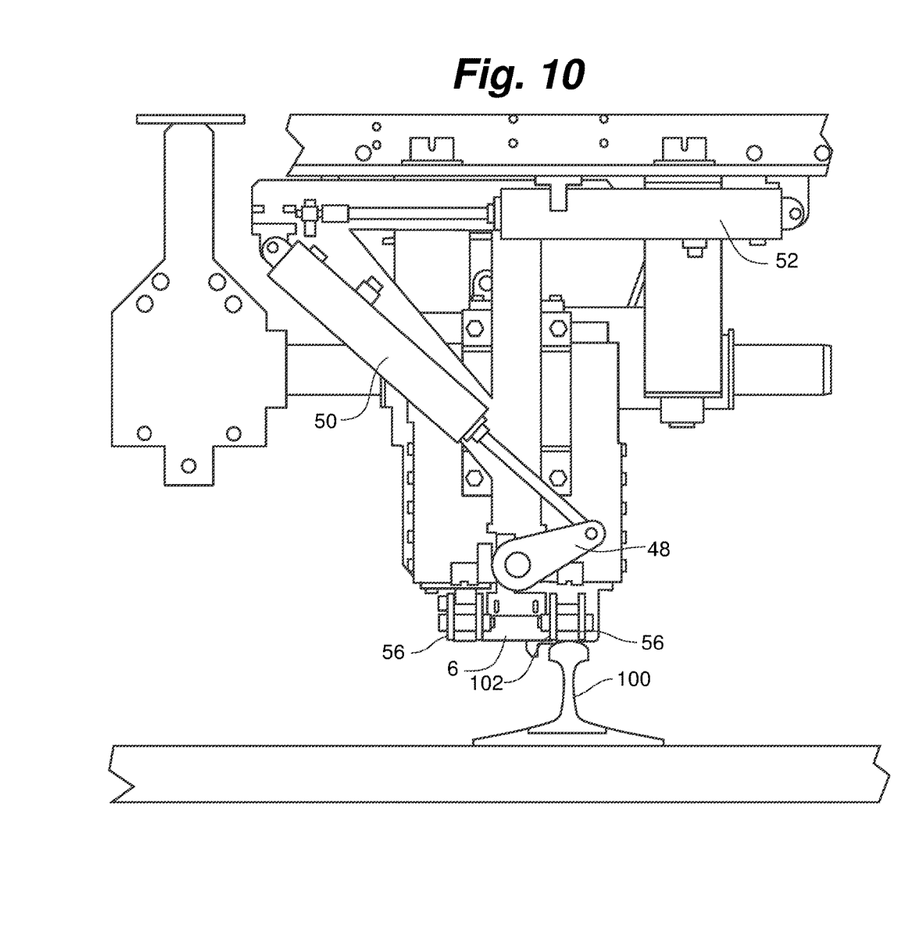
FIG. 10 is a front view of the milling system of FIG. 8.
Figure 11:
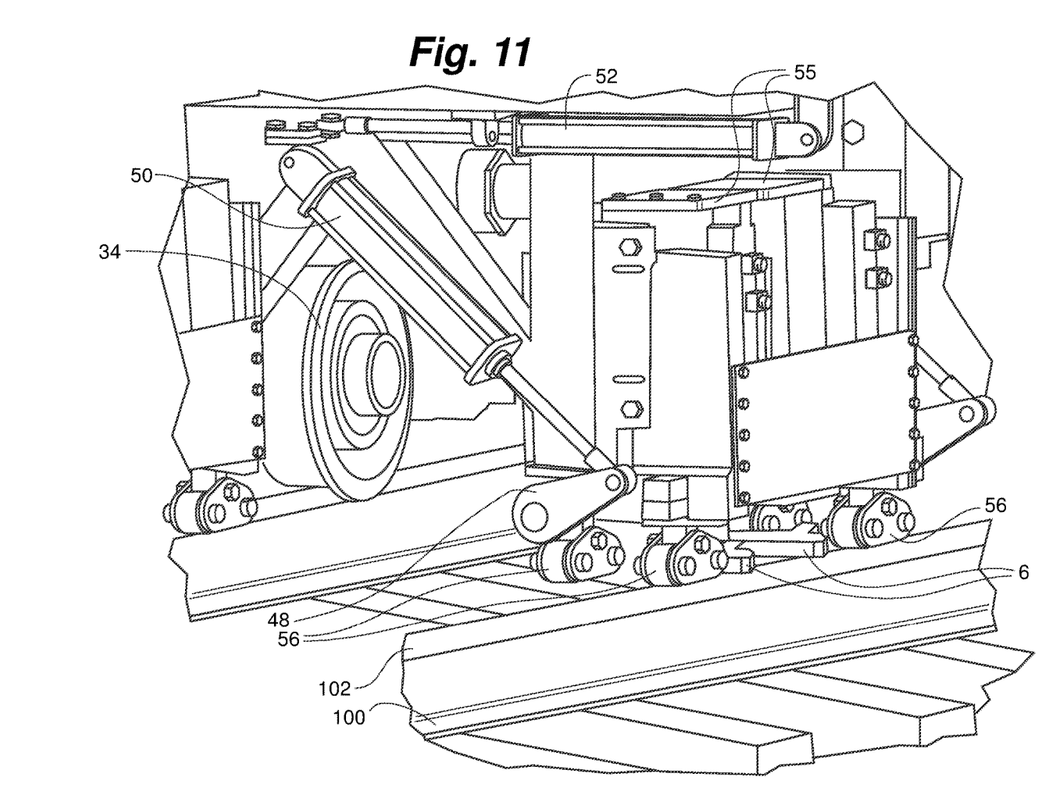

As shown in FIGS. 6a-6c and 7a-7c, in operation, the milling plate 6 is positioned proximate to a rail track 100 such that the at least one milling blade 14 engages a facet of a track surface 102. In a Type-2 configuration, the milling plate 6 is positioned such that the rail track 100 bisects the milling plate 6 and is simultaneously engaged by at least two milling blades 14 positioned on opposite sides of the milling plate 6 as shown in FIGS. 6b and 6c. Alternatively, in a Type-3 configuration, the milling plate 6 is positioned such that rail track 100 intersects the milling plate 6 proximate to the periphery of the milling plate 6 as shown in FIG. 7b. Once positioned proximate to the rail track 100, the milling plate 6 can be rotated to quickly mill and smooth the track surface 102. According to an embodiment of the present invention, an amount of brake horsepower required to rotate the milling plate 6 can be monitored to ensure the milling blades 14 do not cut into the track surface 102. If the brake horsepower required to rotate the milling plate 6 exceeds a predetermined threshold indicating that the milling blades 14 are cutting into the track surface 102, a control system can be configured to automatically trigger cutoff of the milling operation so as to prevent further damage to the track surface 102.

As shown in FIGS. 8-11, various embodiments of a milling system 2 can further comprise a rail car 30 for supporting and positioning at least one milling module 4. The rail car 30 generally comprises a frame 32, a plurality of rail wheels 34 and a positioning assembly 36. The frame 32 further comprises at least two vertical supports 38 supporting an elevated portion 40 between the vertical supports 38. The rail wheels 34 are mounted to a wheel assembly 39 that is operably connected to the vertical supports 38 so as to support the frame 32 and allow the rail car 30 to be pulled down the rail track 100. The positioning assembly 36 can further comprises a positioning platform 42, at least one vertical positioning assembly 44 and at least one horizontal positioning assembly 46. The positioning platform 42 is hung below the frame 32. Each vertical positioning assembly 44 further includes a rotatable positioning arm 48 and a vertical piston assembly 50. Similarly, the horizontal positioning assembly 46 includes a horizontal piston assembly 52. The vertical and horizontal piston assemblies 50, 52 can be electrically or hydraulically actuated. The vertical positioning assembly 44 and horizontal positioning assembly 46 are each operably attached to the positioning platform 42 as well as the milling module 4 such that extension of a piston arm in both the vertical piston assembly 50 and horizontal piston assembly 52 controls the movement and orientation of the milling module 4 relative to the rail track 100. Each milling module 4 includes a motor 55 operably coupled to the milling plate 6. The brake horsepower required to operate motor 55 can be continually monitored by a control system, such as, for example, a remotely located control system to monitor the state of the milling operation. For instance, higher brake horsepower readings can be an indication that milling plate 6 is cutting too deeply into the track surface 102. In certain instances, the control system can continually monitor and shutdown milling module 4 if a brake horsepower setpoint for motor 55 is above or below the setpoint.

As shown in FIGS. 9-12, at least one milling module 4 is mounted to the positioning platform 42. The vertical piston assembly 50 is affixed to the positioning platform 42 and is adapted to adjust the relative distance between the milling plate 6 and the track surface 102 by extending or retracting the piston arm which is coupled to rotatable positioning arm 48. The horizontal piston assembly 52 is affixed to the positioning platform 42 as well as the milling module 4 so as to adjust the angle at which the milling plate 6 intersects the track surface 102.

According to an embodiment of the invention, the positioning assembly 36 can further comprise at least one depth guide 56 for preventing damage to the track surface. The depth guide 56 can further comprise at least one wheel 58 for continually contacting the track surface 102 as the milling system 2 is pulled down the track. The depth guide 56 operably engages the track surface 102 and can physically prevent the vertical positioning assembly 44 from directing the milling module 4 past a predetermined height from the track surface 102 so as to prevent the milling plate 6 from cutting too deeply into or otherwise damaging the track surface.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

What is claimed is:

1. A railway milling system, comprising:
a rail car including at least one positioning assembly; and
at least one milling module including a milling plate, wherein the milling plate comprises a circular plate body defining a milling side and a positioning side, the positioning side rotatably coupled to the positioning assembly, the milling side including a plurality of milling blade assemblies positioned around a perimeter edge of the milling side, wherein each milling blade assembly presents an angled milling surface for individually engaging a rail surface;
wherein the positioning assembly selectively positions the milling plate with respect to the rail surface such that each of the angled milling surfaces sequentially mills a facet on the rail surface as the milling plate is rotated, said positioning assembly configured to horizontally shift the milling plate relative to the rail surface between a range of milling orientations, said range of milling orientations defined between a Type II arrangement and a Type III arrangement, wherein the Type II arrangement includes the angled milling surfaces milling the rail surface in a substantially perpendicular direction to a longitudinal axis defined by the rail surface and, wherein the Type III arrangement includes the angled milling surfaces milling the rail surface in a substantially parallel direction to the longitudinal axis defined by the rail surface.

2. The railway milling system of claim 1, wherein the positioning assembly orients the milling plate with respect to the rail surface such that the rail surface is sequentially engaged by the angled milling surfaces at a periphery of the milling plate in the Type III arrangement.

3. The railway milling system of claim 2, wherein an axis of rotation of the milling plate is offset from a longitudinal axis as defined by the rail surface.

4. The railway milling system of claim 1, wherein the positioning assembly orients the milling plate with respect to the rail surface such that the rail surface is sequentially engaged by the angled milling surfaces simultaneously at two locations of the milling plate in the Type II arrangement.

5. The railway milling system of claim 4, wherein the longitudinal axis as defined by the rail surface bisects the milling plate.

6. The railway milling system of claim 1, wherein the at least one milling module includes a motor for rotating the milling plate.

7. The railway milling system of claim 1, further comprising:
a plurality of milling modules and wherein each milling module is selectively positioned to engage and mill a unique facet of the rail surface.

8. The railway milling system of claim 7, wherein the plurality of milling modules cooperatively engage and mill an entire rail profile of the rail surface.

9. A railway milling system for milling a rail profile of a rail surface, comprising:
a rail car including a plurality of positioning assemblies; and
a plurality of milling modules, wherein a number of milling modules corresponding to a number of positioning assemblies, each milling module including a motor and a milling plate, the milling plate defined by a positioning side and a milling side, wherein the positioning side of each milling plate is operably coupled to the corresponding positioning assembly and wherein the milling side includes a plurality of milling blade assemblies positioned about a periphery of the milling plate with each milling blade assembly defining an angled milling surface,
wherein the motor of each milling module directs the corresponding milling plate to rotate about an axis of rotation,
wherein each positioning assembly selectively positions the corresponding milling module such that each milling plate engages a unique facet of the rail profile, each positioning assembly being configured to horizontally shift the corresponding milling module relative to the rail surface between a range of milling orientations, said range of milling orientations defined between a Type II arrangement and a Type III arrangement, said Type II arrangement including the angled milling surfaces milling the rail surface in a substantially perpendicular orientation to a longitudinal axis defined by the rail surface and said Type III arrangement including the angled milling surfaces milling the rail surface in a substantially parallel orientation to the longitudinal axis defined by the rail surface; and
wherein a combination of each of the unique facets defines a milled rail profile as the rail car traverses the rail surface and each milling module sequentially engages the rail surface.

10. The railway milling system of claim 9, wherein the axis of rotation of each milling plate is offset from a longitudinal axis of the rail surface such that the milling plate engages the rail surface at a single location on a periphery of the milling side in the Type III arrangement.

11. The railway milling system of claim 9, wherein the axis of rotation of each milling plate allows each milling plate to engage the rail surface simultaneously at two locations on a periphery of the milling side in the Type II arrangement, and wherein the two locations define the same unique facet.

12. The railway milling system of claim 11, wherein the longitudinal axis as defined by the rail surface bisects the axis of rotation of at least one of the milling plates.

13. That railway milling system of claim 9, further comprising:
a locomotive for directing the rail car along the rail surface.

* * * * *